June 3, 1930.  E. C. SHILLING  1,761,994
SAFETY BUMPER FOR AUTOMOBILES
Filed Aug. 21, 1929
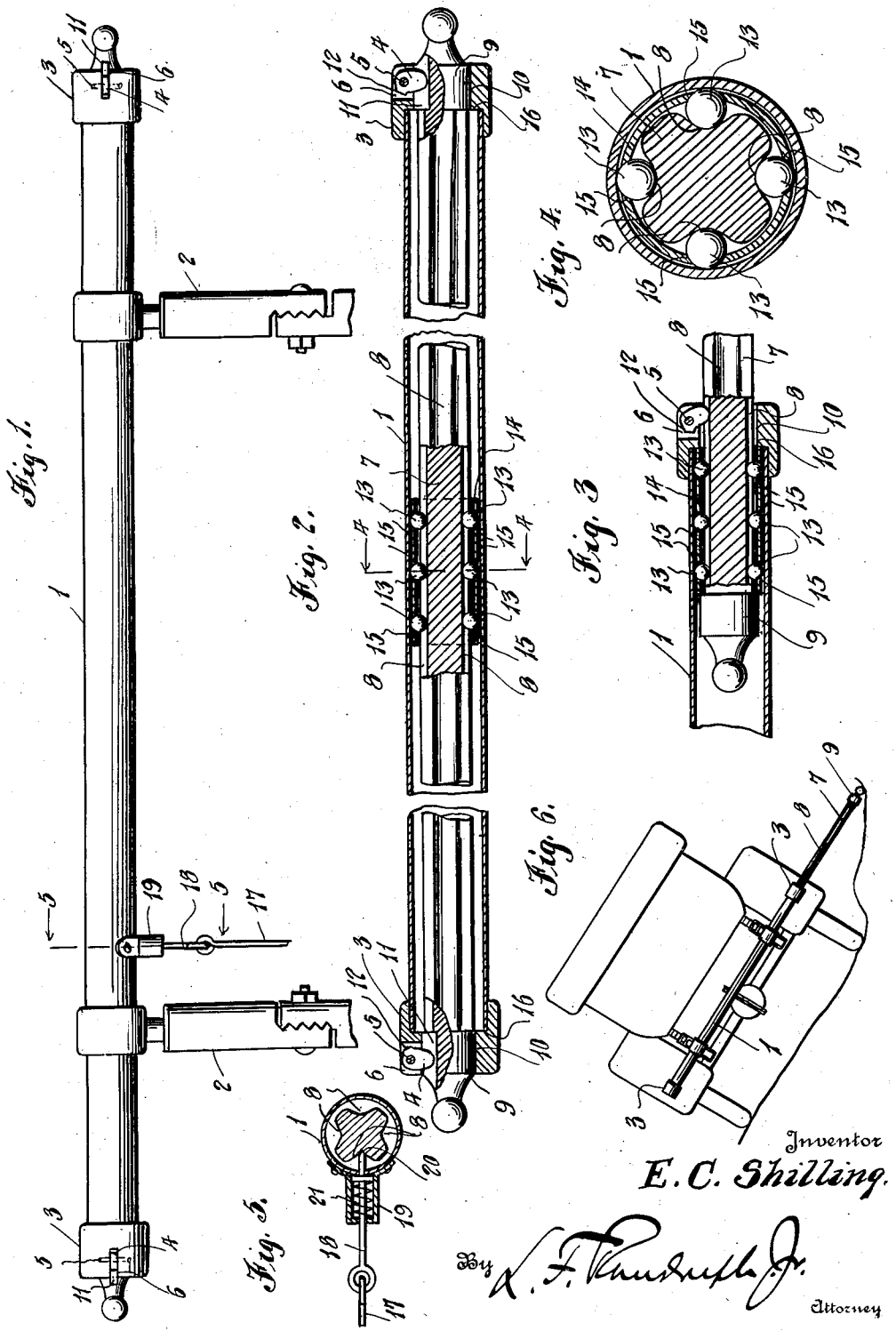
Inventor
E. C. Shilling.
By
Attorney Patented June 3, 1930

1,761,994

UNITED STATES PATENT OFFICE

EDWARD C. SHILLING, OF COLUMBUS, OHIO, ASSIGNOR OF ONE-HALF TO JACOB DAGGER, OF URBANA, OHIO

SAFETY BUMPER FOR AUTOMOBILES

Application filed August 21, 1929. Serial No. 387,460.

The invention relates to safety bumpers for use on automobiles to prevent the vehicles from turning over when ditched or the machine is otherwise tilted, and has for its principal object the provision of an improved construction of safety bumper of the type shown in my previous patents numbered 1,146,355, of July 13, 1915, and 1,231,531, of June 26th, 1917, to the end that the safety device will move more quickly to a bracing position and relative rotation of the safety device and its housing will be eliminated. To this end the invention has for its object the provision of a tubular housing comprising the outer bar of an automobile bumper on which is slidably mounted a solid bar having a plurality of longitudinal grooves therein extending throughout the length of the bar, and mounting an antifriction member between the bar and the inner wall of the tubular housing consisting of a sleeve with openings therein in which are mounted antifriction balls engaging in the longitudinal grooves in the bar and against the inner walls of the housing to permit ready movement of the bar lengthwise of the housing. The bar is provided with heads slightly larger in diameter than the diameter of the bar, at its two ends, and each of the heads is provided with a groove arranged opposite to one of the grooves in the bar, said grooves being deeper than the grooves in the bar, the housing being provided with cam members located normally in the grooves in the heads and engaging the inner face of the alined groove in the bar to hold the bar in an outer position to prevent return of the bar into the housing until the end is released, this forming an automatic lock to hold the bar in a bracing position.

Means is also provided under the control of the operator of the vehicle to hold the bar from movement relatively to the housing.

The invention will be described in detail hereinafter and will be found illustrated in the accompanying drawings in which—

Figure 1 is a top plan view of the improved safety bumper for automobiles showing the brackets for securing the bumper to the vehicle broken away;

Figure 2 is a longitudinal sectional view of the housing, the movable bar being shown broken away and in section;

Figure 3 is a fragmentary view similar to Figure 2 showing the bar in its extreme outer position in one direction;

Figure 4 is a transverse sectional view on a plane indicated by the line 4—4 of Figure 2;

Figure 5 is a transverse sectional view on a plane indicated by the line 5—5 of Figure 1; and Figure 6 is an end view of a vehicle showing the safety member in bracing position.

In the drawings similar reference characters will be used to designate corresponding parts throughout the several views.

The improved safety bumper for automobiles comprises a tubular housing 1 that forms the cross bar of a bumper and is adapted to be secured to the front and rear end of an automobile by means of any selected type of bracket such as shown at 2. Secured to the ends of the tubular housing 1 are tubular heads 3 in which are pivotally secured cam latch members 4 as shown at 5 mounted in slotted openings 6. Slidably mounted in the tubular housing 1 is a bar 7 having a plurality of longitudinal grooves 8 extending throughout the length of the bar and having heads 9 on its ends, the diameter to snugly fit the openings 10 in the tubular head 3, said heads 9 being also of slightly larger diameter than the largest diameter of the bar 7. The heads 9 are provided with grooves 11 to receive the cam latch members 4, said grooves being slightly deeper than the grooves 8 in the bar 7 and one of said grooves in the bar 7 is alined with the grooves 11 so that in outward movement of the bar 7 relatively to the housing 1, at either end thereof the cams 4 will engage the bottom of the grooves 8 and hold the bar in outer position against movement inwardly of the housing until the engaged cam latching member 4 is manually released from engagement with the bar, the cam member being provided with a projection 12 for engagement with a pointed tool for manual release of the member as stated. 13 indicates bearing balls engaging in the grooves 8 and against the inner wall of the tubular housing 1, and 14 indicates a sleeve provided with openings 15 receiving the balls and spacing them. Said sleeve is of sufficient diameter to engage shoulder 16 formed by the bore 10 in each head 3, and the heads 9 on the ends of the bar 7 are of sufficiently larger diameter than the bar to also engage the sleeve 14, this structure providing means for limiting the outward slidable movement of the bar relatively to the tubular housing in either direction.

In Patent #1,231,531, hereinbefore referred to, there is included a means for normally holding the slidable member relatively to the tubular member to prevent accidental movement of the slidable member outwardly of the tubular member, and under the control of the operator of the vehicle by means of a hand operated lever and this construction is introduced into this improved device, the hand operating means not being shown, but there is shown a rod 17 attachable to said lever and secured to a spring actuated detent 18 slidably mounted in a casing 19 secured to the housing 1, said detent entering the tubular housing and adapted to engage in a recess 20 to hold the bar from movement relatively to the housing, 21 designates a spring normally holding the detent 18 in engaging position.

In operation it will be understood that one of each of these bumpers as hereinbefore described is secured to the two ends of the automobile and should the occasion arise that the operator is fearful of the vehicle turning over he can release the detent 18 holding the bar relatively to the tubular housing of the bumpers and the bars will immediately run under the ends of the bumpers at the lower sides and engaging the ground and being held in engaging position by means of the cam members 4 will prevent capsizing of the vehicle. The bars may be returned to their initial position by releasing the cam members from engagement therewith and again secured within the housing 1 by means of the detents 18 engaging in the recesses 20 in the bars of the bumpers. As the cam members 4 engage in the alined grooves 8 and 11, it will be apparent that said cam members will hold the bars 7 from rotation relatively to the tubular housing 1 so that no difficulty will be experienced in engaging the detents 18 with the recesses 20 as hereinbefore stated.

What is claimed is:—

1. A safety bumper for automobiles, comprising a tubular housing, a bar slidably mounted in said housing and having longitudinal grooves therein, anti-friction bearing members engaging in said grooves and bearing in said housing, and means to hold the bar at adjusted positions when extended from either end of the housing.

2. A safety bumper for automobiles, comprising a tubular housing, a bar slidably mounted in said housing and having longitudinal grooves therein, anti-friction bearing members engaging in said grooves and bearing against the inner wall of said housing, and a cam carried by each end of the housing, either of which cams being adapted to engage in a groove in the bar when the bar is extended to hold the bar is extended position.

3. A safety bumper for automobiles, comprising a tubular housing, a bar slidably mounted in said housing and having longitudinal grooves therein, anti-friction bearing members engaging in said grooves and bearing against the inner wall of said housing, an enlarged head on each end of said bar and each head having a groove therein alined with a groove in the bar, tubular heads on the ends of the housing to receive the heads of the bar and providing shoulders at the ends of the housing, a sleeve mounting the bearing members and surrounding the bar, said sleeve engageable with said shoulders and with the heads on the bar to limit the movement of the bar relatively to the housing, and a cam carried by each of said tubular heads and engaging in the grooves in the head and a groove in the bar to hold the bar in extended position, the groove in the cam receiving the cam providing means to hold the bar from rotation relatively to the housing.

In testimony whereof I affix my signature.

EDWARD C. SHILLING.